July 7, 1953.  O. J. SCHOMMER  2,644,459
CARD SORTING DEVICE
Filed June 14, 1950  7 Sheets-Sheet 2
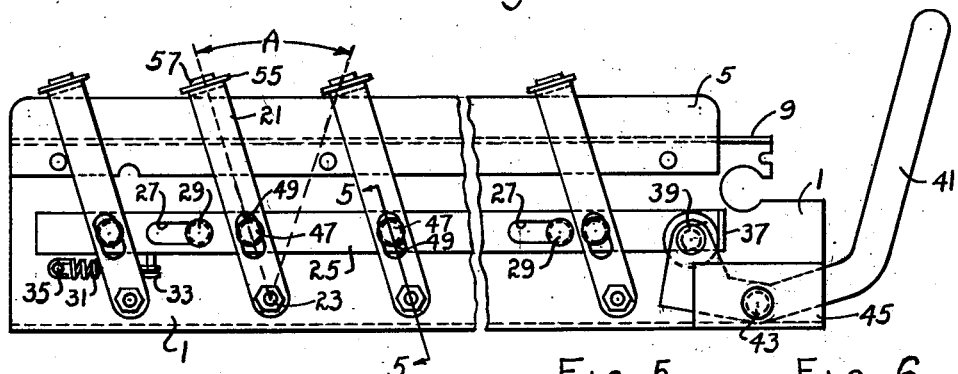
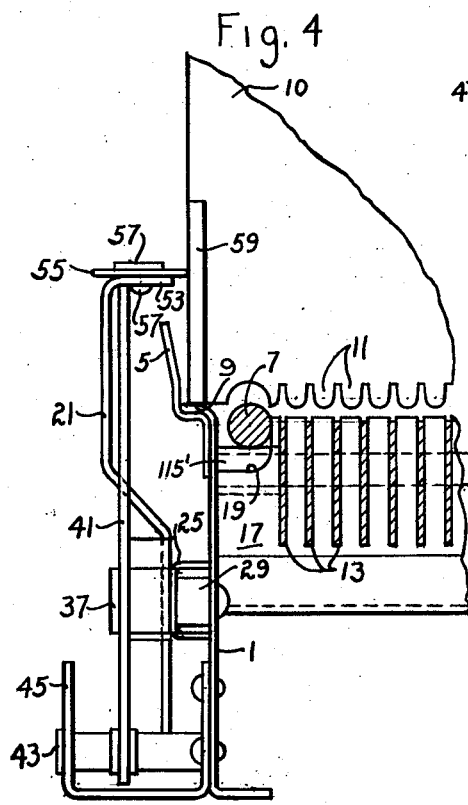
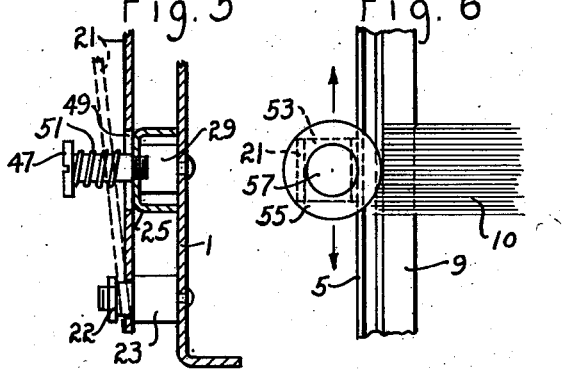
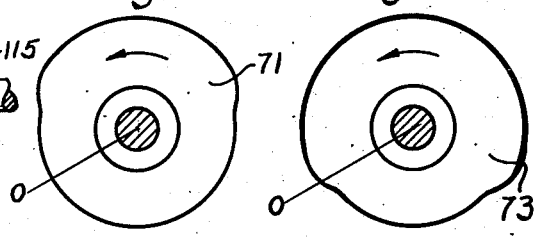
OLIVER J. SCHOMMER
INVENTOR.
BY Edmund W. E. Kamm
ATTORNEY

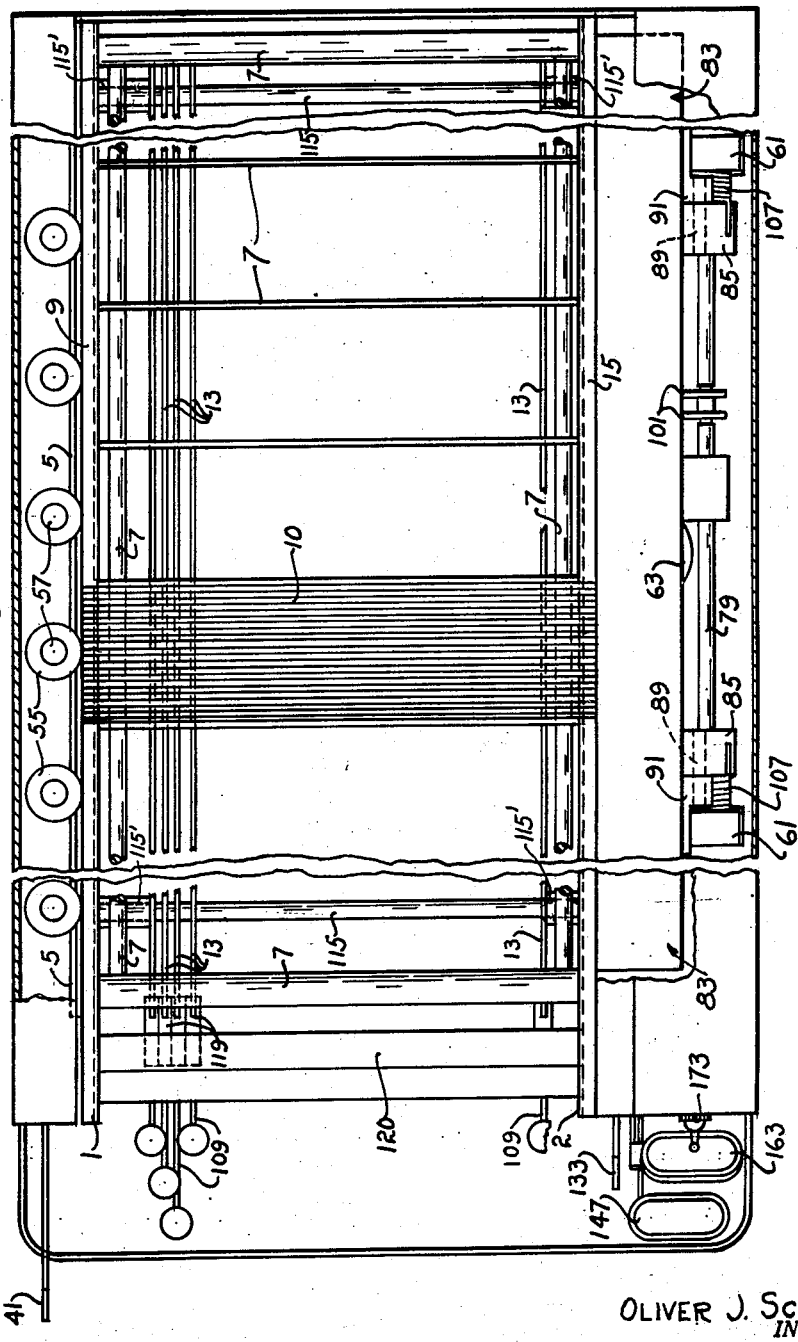

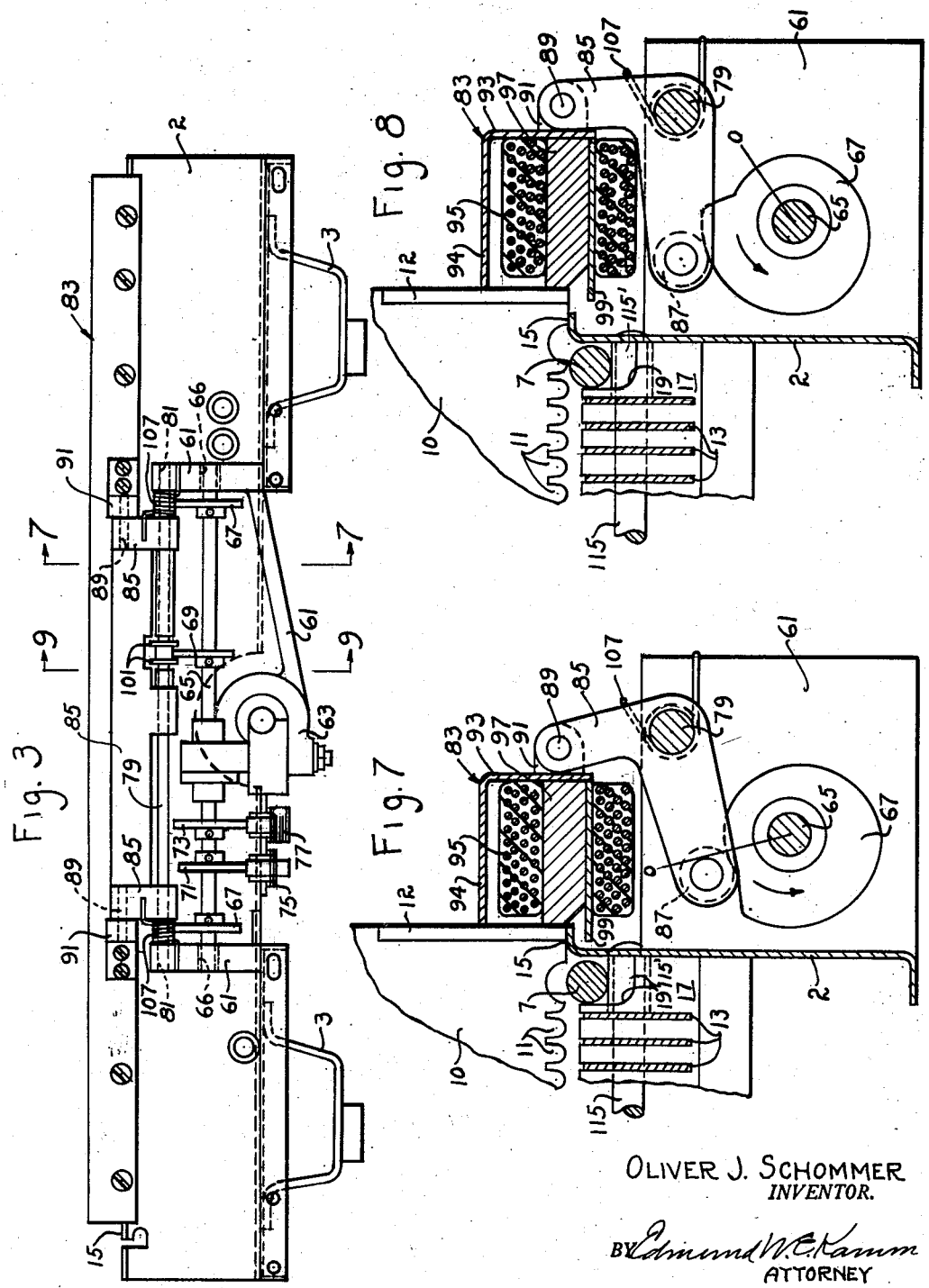

July 7, 1953 O. J. SCHOMMER 2,644,459
CARD SORTING DEVICE

Filed June 14, 1950 7 Sheets-Sheet 4

INVENTOR.
OLIVER J. SCHOMMER
BY Edmund W. E. Kamm
ATTORNEY

July 7, 1953　　　　　O. J. SCHOMMER　　　　　2,644,459
CARD SORTING DEVICE
Filed June 14, 1950　　　　　　　　　　　7 Sheets-Sheet 5
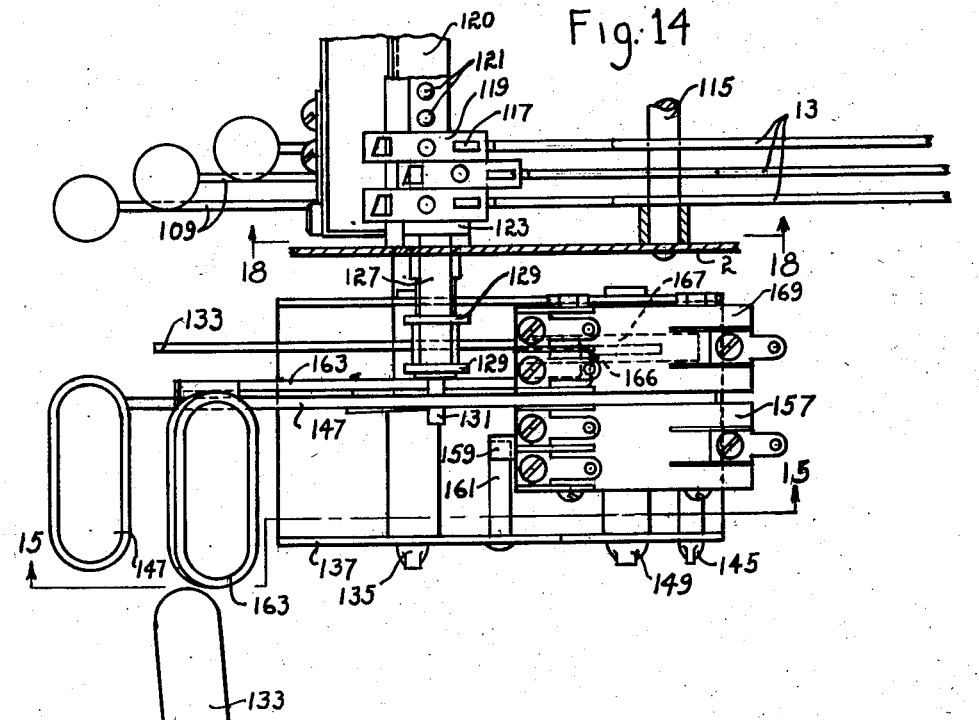
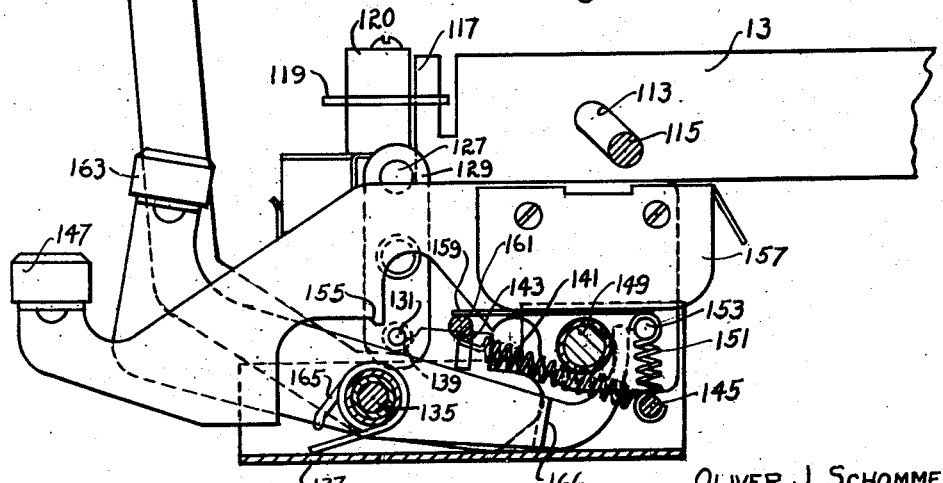
OLIVER J. SCHOMMER
INVENTOR.
BY Edmund W. E. Kamm
ATTORNEY

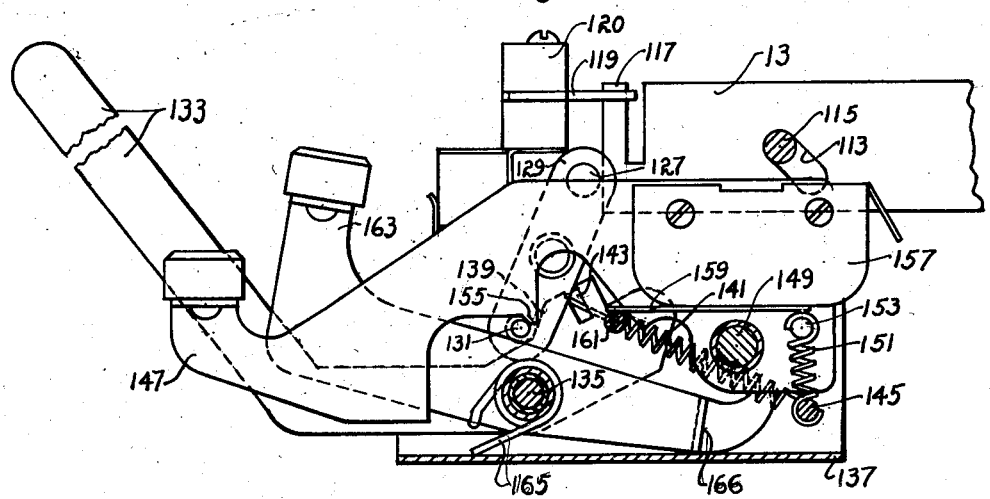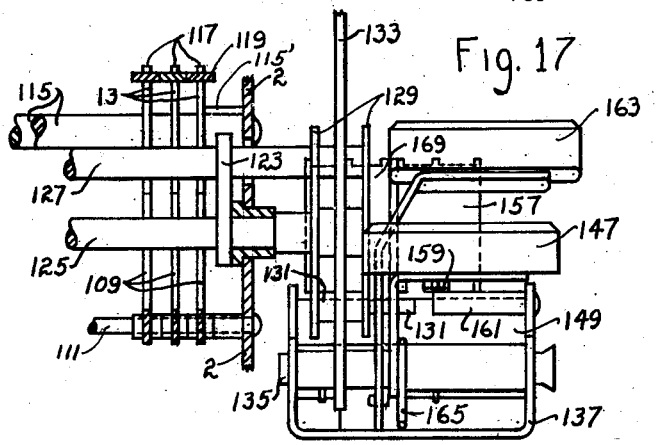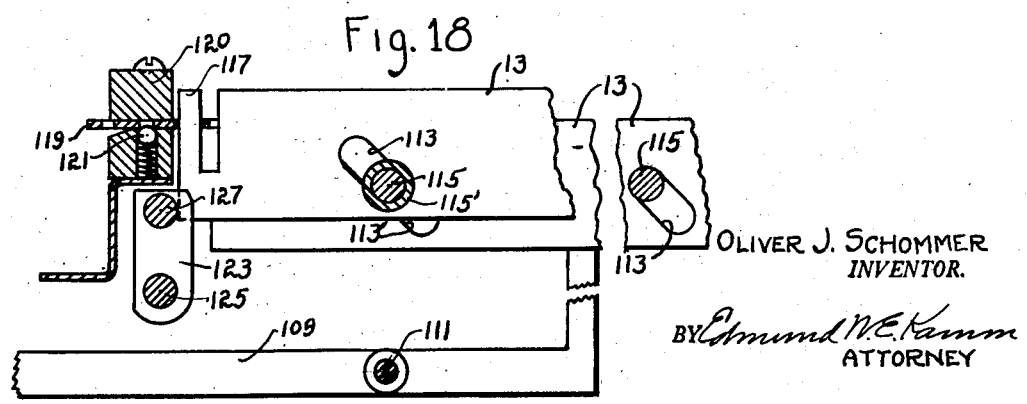

July 7, 1953

O. J. SCHOMMER 2,644,459

CARD SORTING DEVICE

Filed June 14, 1950

OLIVER J. SCHOMMER
INVENTOR.

BY Edmund W.E. Kamm
ATTORNEY

Patented July 7, 1953

2,644,459

UNITED STATES PATENT OFFICE 2,644,459

CARD SORTING DEVICE

Oliver J. Schommer, Melrose Park, Ill., assignor to Johnson Fare Box Company, Chicago, Ill., a corporation of Delaware Application June 14, 1950, Serial No. 168,005

17 Claims. (Cl. 129—16.1)

This invention relates to a card sorting machine. More specifically, it relates to a machine which utilizes cards having a plurality of projections disposed at one edge and a metal armature at another edge. The projections are clipped off in accordance with a predetermined code and when it is desired to sort out all of the cards which are similarly coded, they are placed in a machine, stops are set up according to the code, and thereafter a magnet is brought up to the armatures and is drawn away from them to carry with it the cards which have had the projections, adjacent the stops, cut off.

This structure is generally disclosed in the Whitson patent, No. 2,002,808 of May 28, 1935.

In the Whitson machine, no attempt was made to align the cards against the magnet. The armatures on the cards are small so that the cards can be inserted in a typewriter. This limits the amount of metal contained in the armatures and consequently limits the magnetic pull which can be exerted on the cards. Under such conditions, the loss in pull due to even a small air gap between the armature and magnet results in a high percentage of failures. This has been overcome by aligning the armatures against the magnet. Further, the jumping of the cards to meet the magnet in the prior art machine resulted in damage to the tabs of the cards when they were stopped by striking against the stop bars. This damage has also been eliminated by dressing the cards against the magnet before the power is applied and by slow withdrawal.

Again, in the prior art device, the magnet was relied upon to tilt the card. It was found that this required even more power than the lateral displacement required and resulted in many failures because of the limited magnetic force. This has been overcome by providing positive mechanical means for lifting the card.

A further object of the invention is to provide a machine which is one hundred percent efficient in withdrawing selected cards.

Another object is to provide means for positively aligning and separating all of the cards in a tray prior to sorting.

Yet another object is to provide means for moving the magnet through a predetermined path to engage, withdraw and lift the cards which respond to the code.

A further object of the invention is to provide a system for controlling the cycle of the magnet.

These and other objects will become apparent from a study of this specification and the drawings which are attached hereto, are made a part thereof and in which:

Figure 1 is a top plan view of the machine showing the magnet and card dressing means.

Figure 2 is a side elevation of the machine of Figure 1 showing the dressing mechanism.

Figure 3 is a side elevation of the machine of Figure 1, viewed from the right, and showing the magnet operating means.

Figure 4 is a partial elevation of the machine taken from the right of Figure 2 showing the card dressing mechanism.

Figure 5 is a sectional view taken substantially on line 5—5 of Figure 2 showing the dresser bar mounting.

Figure 6 is a detailed top view of the dresser roll in operation showing how the cards are dressed.

Figure 7 is a sectional elevation taken substantially on line 7—7 of Figure 3 showing the magnet in its normal position adjacent the armatures of the cards.

Figure 8 is a view similar to Figure 7 but showing the magnet with the attached cards withdrawn laterally from the rest of the cards.

Figure 11 is an elevation of the cam 71.

Figure 12 is an elevation of the cam 73.

Figure 14 is a top view of the keyboard and cam control mechanism.

Figure 15 is a sectional view taken on line 15—15 of Figure 14 of the mechanism of Figure 14 showing the stop bars and tab cutting means in preset condition.

Figure 16 is a view similar to Figure 15 but with the mechanism in the normal or restored condition.

Figure 17 is a front elevation of the mechanism of Figures 14 and 15.

Figure 18 is a sectional view taken substantially on line 18—18 of Figure 14 showing the tab cutter mechanism.

GENERAL CONSTRUCTION

Figure 9:
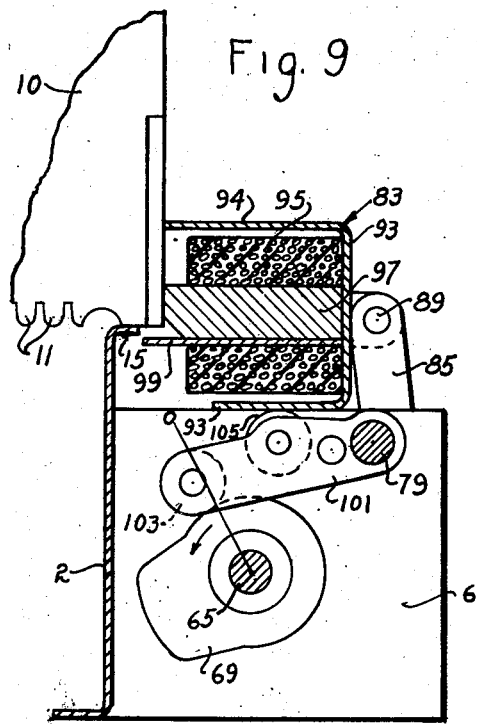
Figure 9 is a sectional elevation taken substantially on line 9—9 of Figure 3 showing the magnet in the position where it is about to be tilted.

Referring to Figure 1, 2 and 3, the numerals 1 and 2 represent a sheet metal frame provided with suitable feet 3. The upper side of the left portion of the frame (Figures 1, 2 and 4) is provided with a guide flange 5 to facilitate the reception of the card holding tray 7 which rests upon sleeves 115' which are mounted on the ends of bars 115, transversely mounted in the frame. The juncture of the frame and flange forms a horizontal seat 9 which, in addition to the fore and aft support of the cards afforded by the tray 7, supports the ends of the cards 10 and holds the tabs 11 of the cards above the stop bars 13. The opposite ends of the cards are supported by the seat formed by frame flange 15 as shown in Figures 1 and 7 to 10.

It will be seen from Figures 4 and 7 that the card supports of the tray 7 drop below the level of the tabs 11 so that the cards will be free to move laterally on the tray and seats 9 and 15. The guide comb 17 for the stop bars 13 is cut away at 19 to provide clearance for the tray.

CARD DRESSING MECHANISM

Figures 2, 4, 5 and 6

It has been learned that two important factors contributing to the efficiency of the device lie in insuring that the cards are all separate from each other and are not stuck together and that they are all in contact with the magnet before the withdrawal of the cards is started.

To insure that these conditions prevail, a series of dressing levers 21 are pivotally mounted on bearings 22 and studs 23 which are fixed to the frame 1. The bearings are longer than the thickness of the levers and the holes in the ends of the levers are larger than the diameter of the bearing so that the levers may pivot about the axis of the bearing and also pivot in a plane which includes the axis, as is shown by dashed lines in Figure 5.

A U-shaped rail 25 has elongated slots 27 near either end, the edges of which ride on studs 29 mounted on the frame.

A spring 31 is connected between a pin 33 on the rail and a pin 35 on frame 1 to hold the rail normally with the forward ends of the slots stopped by the studs 29.

The forward end of the rail has an ear 37 bent outwardly so that it will be contacted by a roller 39 mounted on the bell crank 41 which is pivotally mounted at 43 on a bracket 45 attached to frame 1.

A shoulder stud 47 passes through a slot 49 in each of the dressing levers 21 and is screwed into the rail 25. A spring 51 is confined between the head of the stud and the lever so as to hold the latter normally against the rail, as shown in Figure 5, although the lever may pivot to the dashed line position against the action of spring 51.

The top end of each lever is bent inwardly at right angles to form a platform 53 on which a dressing disc or roller 55 is rotatably mounted by pin 57.

As shown in Figure 4, the rollers 55 contact the armatures 59 on the cards 10 under the pressure of the springs 51 and as the lever 41 is actuated the rollers will rock in an arc A forward and back (Fig. 2) across the cards. Each roll will act on the cards held in one section of the tray, displacing them forceably, laterally into contact with the magnet, as will be described below, and since the cards are moved one by one, this tends to shear each card from the ones adjacent it so that the cards are free (see Fig. 6) and insures that the cards are in contact with the magnet.

The spring 31 will then return the rollers and arms 21 to their normal positions.

CARD WITHDRAWING MEANS

Figures 1, 3, 7 to 13 inclusive

A bracket 61 is mounted on the side 2 of the frame and supports a motor 63 which is geared to drive shaft 65 mounted in bearings 66 in the bracket. Fixed to the shaft are two cams 67 which impart a horizontal movement to the magnet, a cam 69 which tilts the magnet and two cams 71 and 73 which actuate the switches indicated generally by 75 and 77 respectively.

A pivot shaft 79 is also mounted in bearings 81 in the bracket and supports the electromagnet assembly indicated generally by 83.

Mounted on shaft 79, adjacent each end thereof, is a cast member 85 which has the form of a bell crank. One arm of each crank carries a roller 87 which rides on a cam 67 and the other arm of which is pivotally connected at 89 to an ear 91 of the soft steel, magnetic housing 93 for the magnet coil 95. This coil is wound around the soft steel core 97 which is fixed to the housing. A nonmagnetic plate or lip 99 is disposed below and in contact with the core 97 and projects outwardly beyond it and the housing at a level below that of the flange 15 on the frame 2, as is clearly shown in Figures 7 and 8.

Figure 10:
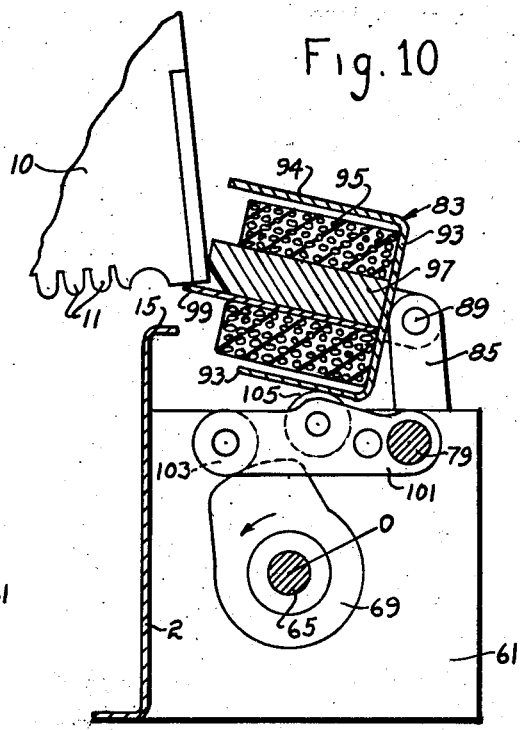
Figure 10 is a view similar to Figure 9 showing the magnet in its fully tilted position.
Figure 13:
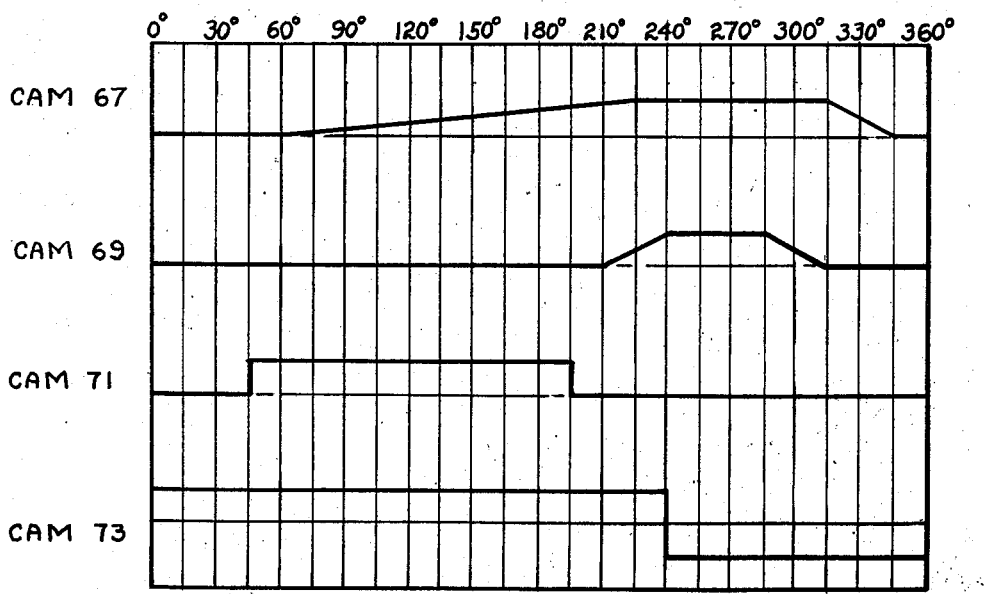
Figure 13 is a time motion diagram of the cams.

As shown in Figures 9 and 10, the housing also extends below the coil in the region of the cam 69.

A pair of parallel levers 101 are pivotally mounted at one end on shaft 79 and bear between them a roller 103 at the other end which follows cam 69. A roller 105 mounted substantially midway between the levers, projects above the upper edges of them and forms a support for the lower portion of housing 93.

A pair of springs 107 are mounted on shaft 79 and are applied to the member 85 so as to rotate it counterclockwise (Figs. 7 and 8) so that rolls 87 will follow the cam.

OPERATION

Figure 7 depicts the normal starting position of the parts. In this position the magnet assembly occupies its innermost position adjacent the armatures 12 of the cards 10, so that when the cards are dressed by the rolls 55, they will be forced toward and into contact with the edge of the housing 93 and the armature 97. As noted above, the lip 99 is disposed below the level of the cards 10.

As shaft 65 rotates counterclockwise (Fig. 7), the roller 87 will rise, as shown by the time-motion diagram (Fig. 13), and withdraw the magnet in a substantially straight line motion on the roller 105, away from the cards 10 to the position shown in Figure 8. The cards which are not held by the selector bars 13 move with the magnet.

Near the end of this motion of the magnet, the cam 69 becomes effective to raise the roller 103. This tilts the levers 101 and roll 105 is elevated to tilt the magnet about the pivot 89 to the Figure 10 position.

The lip 99, which extends outwardly beyond the armature 97, thus engages the lower side of the selected cards and tilts them, as shown in Fig. 10, so that the right-hand corners thereof are above the level of the remainder of the cards.

It will be seen that since the armature 97 and the top edge 94 of the housing 93 are in substantially the same plane, there is no tendency to tilt the cards when the magnet becomes energized.

The magnet is normally stopped in the Figure 10 position as will be described. When it is reset, the shaft 65 rotates to first drop the roller 103 to its normal position to bring the magnet to its horizontal position, after which cam 67 is returned to its normal position to drop the follower 87 and springs 107 urge the magnet to the Figure 7 position ready for another actuation.

CONTROL MECHANISM

Figures 14 to 18

SELECTOR BARS AND OPERATORS

As shown in Figure 18 particularly, the key levers 109 are pivoted at 111 and each key is adapted to raise a selector or stop bar 13, the slots 113 therein moving relative to the guides 115. The forward end of each bar is engaged by means of a hook 117 with the knife 119 which is supported in a guide block 120. A detent 121 holds the bar in the position to which it is set by the key and a rocker 123, pivoted at 125, may be actuated to reset the selected bars and the knives to their normal positions. The rocker comprises a master bar 127 common to all of the selector bars.

CLEARING LEVER

The shaft 125 and bar 127 extend beyond the frame 2 and carry a pair of arms 129 which extend downwardly and are joined by a pin 131 at their lower ends. A clearing lever 133 is pivotally mounted on a shaft 135 in a frame 137 and has a cam 139 which engages the pin so that when the lever is rotated to its counterclockwise position, as shown in Figure 16, the rocker will be rotated clockwise to reset the selector bars.

A spring 141 stretched between an ear 143 on lever 133 and a pin 145 on the frame normally holds the lever in the Figure 15 position.

STARTING KEY

The operation starting key 147 is pivotally mounted on a shaft 149 supported by frame 137 and is held in its normal, clockwise position (Fig. 15) by spring 151 connected to a pin 153 on the lever and pin 145.

The key has a locking surface 155 which overlies the pin 131 which extends laterally beyond the levers 129. When none of the selector bars have been actuated, the rocker 123, levers 129 and pin 131 will occupy the Figure 16 position, in which the pin 131 lies beneath the surface 155 and prevents the depression of this key.

As soon as a key bar 109 is depressed, however, its selector bar will move to the Figure 15 position and return the pin to the position shown in that figure which clears the surface 155 so that the key may be depressed.

The starting switch 157 is mounted on the key 147 and its actuating lever 159 contacts a pin 161 fixed in the frame. Thus when the key 147 is rotated counterclockwise, the switch rotates with it and is closed.

REPEAT KEY

The repeat key 163 is pivotally mounted on shaft 135 and is urged in a clockwise direction (Figs. 15 and 16) by a spring 165. As shown in Figure 14, the key is offset at 166 to bring it into alignment with the operating lever 167 of the switch 169 which is mounted on frame 137, and is also curved upwardly behind shaft 149 so as to clear it.

It will be seen from Figure 14 that the clearance lever 133 also underlies the switch lever 167 so that the switch will be closed thereby when lever 133 is moved to the Figure 16 position.

WIRING DIAGRAM

While the machine may obviously be constructed for operation on direct current, the alternating current unit is described herein. The alternating power supply is connected with the machine through the mains 171 and 172. A switch 173 is connected in the line 171.

Circuit A is established from main 171 through line 175, rectifier 177, line 179, cam switch 75, line 181 to main 172. Thus the rectifier is energized in accordance with the operation of the motor.

Circuit B is closed by switch 157 controlled by starting key 147 and extends from main 171 through line 183, normally closed contacts 185 of cam switch 77, line 187, key switch 157, line 189, relay magnet 191, lines 193, 195 to main 172.

This energizes the relay 191 to open the normally closed switches 197 and 203 and closes the normally open switches 199, 201 and 205.

Circuit C is a holding circuit for the relay and parallels switch 157 by wires 207 and 209 which run from switch 201 on the relay to wires 187 and 189 respectively.

Circuit D through the motor armature is set up by switch 199 on the relay as follows: main 171, line 211, switch 199, line 213, armature 215, line 217, magnet of the braking relay 219, line 221, field coil 223 of the motor and line 225 to the main 172.

Circuit E which is closed by the contacts 243 on braking relay 219 extends from main 171 through line 175, rectifier 177, line 227, normally closed relay contact 229, line 239, normally closed relay contacts 203, line 241, closed contacts 243 on braking relay 219, resistance 245, lines 247, 249 and 221 to the motor field 223 and line 225 to main 172. Since this circuit passes through relay contacts 203 and 229 which are open when either relay 191 or 263 is energized, the circuit is ineffective while the motor is running normally.

This circuit is held open by circuit D described above, which holds the motor energized.

Circuit F through the electromagnet 95 is closed by normally open relay switch 205 from the positive side of the rectifier 177 through lines 227, 251, switch 205, line 253, magnet 95 and line 255 to the negative side of the rectifier.

Circuit G which is controlled by the switch 169, operated by either the repeat key 163 or the clearing key 133, is conditioned for operation by the opening of contacts 185 of cam switch 77 and closing of contacts 257. Upon closure of the switch 169, the circuit will be established from main 171 through line 183, contacts 257, line 259, switch 169, line 261, the magnet of relay 263 and lines 265 and 195 to main 172.

Normally closed switches 229 and 235 on this relay are opened while normally open switches 231, 233 and 237 are closed.

Circuit H is a holding circuit for relay 263 which is energized by switch 237 which is connected by wires 267, 269 to wires 259, 261 to parallel switch 169 which reopens.

Circuit J from main 172 through wire 271, switch 233 and line 273 extends power to the motor circuit D described above so that the motor will again start.

Figure 19:
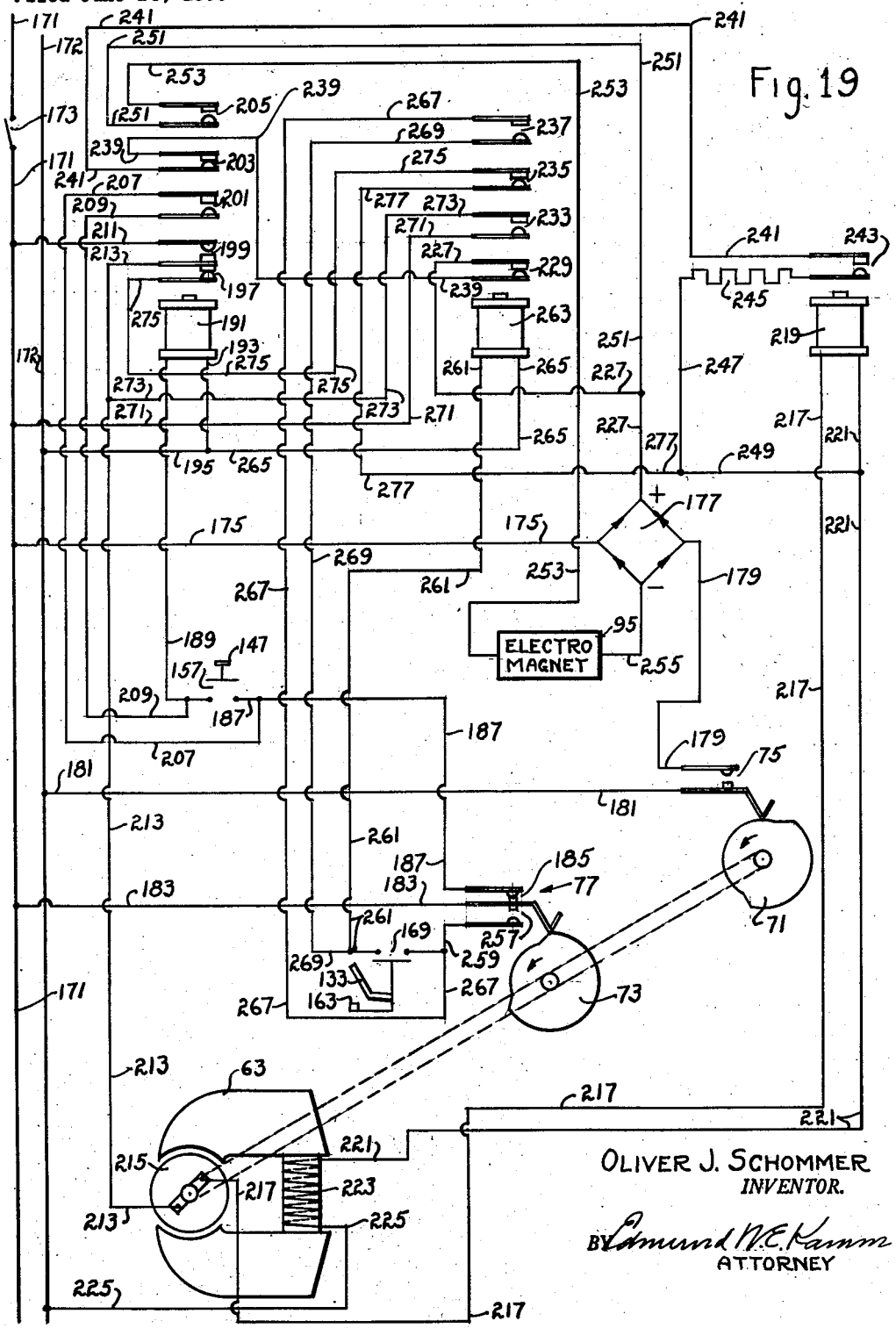
Figure 19 is a diagrammatic view of the wiring and the control mechanisms.

The circuit J and holding circuit H are held until cam switch 77 is moved to its initial position shown in Figure 19, in which contacts 257 are broken and 185 are remade.

The cam switch 75 is open during this operation so that the rectifier is deenergized.

Circuit K is a short circuit through the armature of the motor and the braking relay as follows: from the braking relay through line 217, armature 215, line 213, contacts 197 on relay 191, line 275, contacts 235 on relay 263, lines 277, 249 and part of line 221 to the braking relay.

OPERATION

Assuming that all of the parts are in their normal positions as described above, that is, the magnet 95 in the Figure 7 position, the cam switches 75 and 77 in the positions shown in Figure 19 and the clearing lever 133 in the Figure 15 position, the operator will place a selected file of cards on the machine.

The ends of the cards 10 will rest upon the ledges 9 and 15 while the file 7 will be clear of the cards.

Next the keys 109 spelling out the code of the cards wanted will be depressed to raise the corresponding selector bars 13.

The dressing mechanism is next operated by pulling lever 41 to move the dressing rolls across the armatures 59 of the cards to move them into contact with the magnet.

Next the starting switch 157 is closed momentarily by depressing the starting key 147. This switch energizes circuit B to energize relay 191.

The switch 201 on the relay closes the holding circuit C through the relay to hold the relay energized.

The contacts 199 on this relay also close the motor circuit D to start the motor and since this circuit also includes the magnet of the braking relay 219, this magnet is energized to close its contacts 243.

The motor 63 will start and reference to the cam diagram (Fig. 13) will show that the first 45-degree revolution of the shaft 65 will move cam 71 to close its switch 75. This energizes the circuit A through the rectifier 177 and since the circuit F through the card pulling magnet 95 was closed by switch 295 on relay 191, the magnet will now be energized.

After the shaft has been rotated an additional 15 degrees, approximately, to the 60-degree position, the cam 67 starts operating the arms 85 to withdraw the electromagnet and the free cards away from the cards which are held by the selector bars 13, in a substantially rectilinear, horizontal path. This action is substantially completed at 225 degrees.

Meanwhile, at about 195 degrees, the cam 71 has opened switch 75 and circuit A is broken through the electromagnet.

At about 210 degrees, the cam 69 picks up lever 101 and tilts the magnet and lip 99 so that the cards will be tilted upwardly as shown in Figure 10. This tilting action is complete at about 240 degrees from the start and at this point the cam 73 actuates switch 77 to open contacts 185 and close contacts 257.

The opening of contacts 185 breaks the holding circuit C through relay 191 which is deenergized and breaks the circuit D through the motor.

At the moment the motor circuit is broken, a dynamic braking action is applied to the motor to prevent undue coasting of the motor and the parts driven thereby.

The braking action is based upon the well known fact that a brush-type motor can be stopped by energizing the field with a direct current voltage and by short circuiting the armature.

The rectified current is applied to the field through the circuit E by the braking relay contacts 243 which were closed during operation of the motor.

The armature circuit is shorted, as soon as relay 191 is deenergized, through circuit K. Since this circuit also includes the breaking relay, this relay will be held energized and its contacts 243 will be held closed until the motor slows sufficiently to reduce the current to the point that the relay opens. The motor is thus braked to a stop and the machine is stopped with the magnet in the Figure 10 position.

The raised cards are then removed from the file and the switch 169 may be closed either by clearing lever 133 or by repeat key 163.

If the lever is used, all of the bars 13 are returned to normal. If the repeat key is used, the bars which were initially set up are held set. The start key cannot be depressed if lever 147 is used because it is locked out by pin 131.

In either case, closure of switch 169 energizes circuit G to energize relay magnet 263. The switch 237 on this relay sets up the holding circuit H which keeps the relay energized while the switch 233 extends power through circuit J to the motor circuit D to again start the motor and energize braking relay 219.

As the motor shaft 65 rotates from about the 285-degree position to the 315-degree position, the cam 69 will control the tilting of the magnet back to its horizontal position under the action of gravity and thereafter rotation from the 315 to the 345-degree position will cause cam 67 to advance the magnet to its normal position adjacent the cards. This motion is a substantially rectilinear, horizontal motion.

At the end of the next 15 degrees, approximately, which represents the full revolution of 360 degrees, the switch contacts 257 are opened, while 185 are reclosed, and again the armature is short circuited by circuit K. The rectifier circuit E is also set up and the motor is quickly braked to a stop. This completes the cycle.

The operation may be restarted by pressing the start key, if the clearing lever has not been operated. Thus cards of the same code may be sorted from different trays or an additional key or keys may be operated to change the code on the first tray.

If the clearing lever has been used, new keys 109 will have to be actuated to unlock the start key from control of pin 131.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises a magnet, metallic core means connected with the magnet, part of said means providing a path for magnetic flux, means mounting the metallic means adjacent said armatures, means mounted adjacent the opposite ends of the cards for movement toward said cards and also transversely across the ends of the cards to dress them against the metallic means and means for moving said metallic means away from the ends of said cards to move the free cards.

2. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises a magnet, metallic core means connected with the magnet, part of said means providing a path for magnetic flux, means mounting the metallic means adjacent said armatures, means mounted adjacent the opposite ends of the cards for movement toward said cards, also transversely across the ends of the cards, means operable at will for moving said means in said transverse direction to dress them against the metallic means and means for moving said metallic means away from the ends of said cards to move the free cards.

3. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises a magnet, metallic core means connected with the magnet, part of said means providing a path for magnetic flux, means mounting the metallic means adjacent said armatures, means disposed adjacent the opposite ends of the cards for dressing them against said metallic means comprising a number of arms, means for pivotally mounting each arm on the frame for rotation about an axis which is substantially parallel to the lower edges of the cards, a card engaging member on each arm, means for moving said arm and member about the axis relative to the cards and means for moving said metallic means away from the ends of said cards to move the free cards.

4. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises a magnet, metallic core means connected with the magnet, part of said means providing a path for magnetic flux, means mounting the metallic means adjacent said armatures, means disposed adjacent the opposite ends of the cards for dressing them against said metallic means comprising a number of arms, means for pivotally mounting each arm on the frame for rotation about an axis substantially parallel to the lower edges of the cards, a disc mounted on each arm for rotation about an axis substantially normal to the pivotal axis, means for urging said discs against said ends of the cards and means for moving said metallic means away from the ends of said cards to move the free cards.

5. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, means operable at will for energizing the motor, first means controlled by the motor for energizing the magnet, means operated by the motor for withdrawing the magnet from its position adjacent the armatures to withdraw the free cards, said first means serving thereafter to deenergize the magnet, additional means operable by said motor for lifting the withdrawn cards and means under control of the motor for stopping the motor.

6. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, means operable at will for energizing the motor, first means controlled by the motor for energizing the magnet, means operated by the motor for withdrawing the magnet from its position adjacent the armatures to withdraw the free cards, said first means serving thereafter to deenergize the magnet, additional means operable by said motor for lifting the withdrawn cards, means under control of the motor for stopping the motor, additional means operable at will after said motor has been stopped for restarting said motor, means operable thereby for restoring said lifting means and said magnet to their initial positions and means for again stopping the motor.

7. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, means operable at will for energizing the motor, first means controlled by the motor for energizing the magnet, means operated by the motor for withdrawing the magnet from its position adjacent the armatures to withdraw the free cards, said first means serving thereafter to deenergize the magnet, additional means operable by said motor for lifting the withdrawn cards and means under control of the motor for stopping the motor, said stopping means including means for braking the motor.

8. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, means operable at will for energizing the motor, first means controlled by the motor for energizing the magnet, means operated by the motor for withdrawing the magnet from its position adjacent the armatures to withdraw the free cards, said first means serving thereafter to deenergize the magnet, additional means operable by said motor for lifting the withdrawn cards and means under control of the motor for stopping the motor, said motor having an armature and field, said stopping means including means for short circuiting the armature of the motor and means for applying direct current to the field.

9. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a relay, means operable at will for energizing said relay, means controlled by the relay for starting the motor, magnet operating means actuated by the motor for withdrawing the magnet from the card pack to withdraw the free cards therefrom, lifting means operated by the motor for thereafter lifting said withdrawn cards and means operated by the motor for deenergizing said relay to deenergize the motor.

10. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a relay, means operable at will for energizing said relay, means controlled by the relay for starting the motor, magnet operating means actuated by the motor for withdrawing the magnet from the card pack to withdraw the free cards therefrom, lifting means operated by the motor for thereafter lifting said withdrawn cards, means operated by the motor for deenergizing said relay to deenergize the motor and means responsive to the deenergization of the relay for braking the motor.

11. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a first relay, means operable at will for energizing said relay, means controlled by the relay for starting the motor, magnet operating means actuated by the motor for withdrawing the magnet from the card pack to withdraw the free cards therefrom, lifting means operated by the motor for thereafter lifting said withdrawn cards, means operated by the motor for deenergizing said relay to deenergize the motor, a second relay, means operated by the relay deenergizing means for conditioning said second relay for energization, second means operable at will for energizing said second relay, means operable by said second relay for reenergizing said motor, said motor serving to return said card lifting means and said magnet operating means to their initial positions, said deenergizing means serving thereafter to deenergize said second relay and condition the first relay for energization and means responsive to deenergization of the second relay for deenergizing the motor.

12. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a first relay, means operable at will for energizing said relay, means controlled by the relay for starting the motor, magnet operating means actuated by the motor for withdrawing the magnet from the card pack to withdraw the free cards therefrom, lifting means operated by the motor for thereafter lifting said withdrawn cards, means operated by the motor for deenergizing said relay to deenergize the motor, a second relay, means operated by the relay deenergizing means for conditioning said second relay for energization, second means operable at will for energizing said second relay, means operable by said second relay for reenergizing said motor, said motor serving to return said card lifting means and said magnet operating means to their initial positions, said deenergizing means serving thereafter to deenergize said second relay and condition the first relay for energization, means responsive to deenergization of the second relay for deenergizing the motor, motor braking means and means responsive to the deenergization of said second relay for rendering said motor braking means effective.

13. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a relay, a switch operable at will for energizing said relay, a relay operated switch for starting the motor, a first cam driven by the motor, a follower for the cam connected to the magnet and serving to withdraw the magnet from the card pack to withdraw free cards therefrom, a second cam and a follower therefor, means operable by said second follower for lifting the withdrawn cards, a selector switch and a switch cam operable by the motor for operating said selector switch to deenergize said relay, said relay operated switch serving to thereupon deenergize the motor.

14. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a first relay, a switch operable at will for energizing said relay, a relay operated switch for starting the motor, a first cam driven by the motor, a follower for the cam connected to the magnet and serving to withdraw the magnet from the card pack to withdraw free cards therefrom, a second cam, a follower therefor, means operable by said second follower for lifting the withdrawn cards, a first switch connected to control the relay, a third cam operable by the motor for opening said first switch to deenergize said first relay, a second relay, a second switch connected to control the second relay and operable by the third cam to condition the second relay for operation, a third switch operable at will for thereafter energizing said second relay and a second relay operated switch for reenergizing said motor, said second cam and first cam serving thereupon, to return the lifting and withdrawing followers respectively to their initial positions, said third cam serving thereafter to operate said relay control switches to deenergize the second relay and condition the first relay for subsequent operation, said second relay operated switch serving to deenergize said motor.

15. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted at one end of each card, the improvement which comprises an electromagnet, metallic core means connected with the magnet, part of said means providing a path for magnetic flux, means mounting said magnet on said frame for movement to and from a position closely adjacent the armatures, a motor, a first relay, a switch operable at will for energizing said relay, a relay operated switch for starting the motor, a first cam driven by the motor, a follower for the cam connected to the magnet and serving to withdraw the magnet from the card pack to withdraw free cards therefrom, a second cam and a follower therefor, means operable by said second follower for lifting the withdrawn cards, a second relay, a selector switch having one position in which it makes and breaks the circuits of the first and second relays respectively and having a second position in which it breaks and makes said circuits respectively, a switch cam operable by the motor for operating said selector switch to its second position, a second switch operable at will for thereafter energizing said second relay, a second relay operated switch for reenergizing said motor, said second cam and first cam serving to return the lifting and withdrawing followers respectively to their initial positions, said switch cam serving thereafter to operate said selector switch to its first position, said second relay operated switch serving to deenergize said motor, said motor having armature coils and field coils, first and second normally closed switches on each relay, a braking relay, said braking relay and the armature coils being connected in series with said first normally closed switches to form a closed circuit when said normally closed switches are closed, a resistance, a pair of normally open contacts on the braking relay and a source of direct current all connected in series with said field coils to apply current to said field coils to stop said armature quickly.

16. In a card sorting mechanism comprising a frame, presettable bars movably mounted thereon, means for selectively setting said bars, means for supporting a pack of cards edgewise above said bars, certain of said cards having tabs depending from their lower edges to cooperate with the set bars to prevent endwise movement of these cards while other cards having the tabs adjacent the selectively set bars removed are free to move endwise and armature means mounted, at one end of each card, the improvement which comprises a magnet, metallic core means connected with the magnet, part of said means providing a path for magnetic flux, means for mounting the metallic means adjacent said armatures, means disposed adjacent the opposite ends of the cards for dressing them against said metallic means comprising a number of arms, means for pivotally mounting each arm on the frame for rotation about an axis which is substantially parallel to the lower edges of the cards, a card engaging member on each arm, means for moving said arm and member about the axis relative to the cards, means for moving said metallic means away from the ends of said cards to move the free cards, and means for lifting the metallic means to raise said withdrawn free cards above the level of the pack.

17. In a card sorting mechanism comprising a frame, presettable bars movably mounted thereon, means for selectively setting said bars, means for supporting a pack of cards edgewise about said bars, certain of said cards having tabs depending from their lower edges to cooperate with the set bars to prevent endwise movement of these cards while other cards having the tabs adjacent the selectively set bars removed are free to move endwise, and armature means mounted at one end of each card, the improvement which comprises a magnet, metallic core means connected with the magnet, part of said means providing a path for magnetic flux, means mounting the metallic means adjacent said armatures, means mounted adjacent the opposite ends of the cards for movement toward said cards, also transversely across the ends of the cards, means operable at will for moving said means in said transverse direction to dress them against the metallic means, means for moving said metallic means away from the ends of said cards to move the free cards, and means for lifting the metallic means to raise said withdrawn free cards above the level of the pack.

OLIVER J. SCHOMMER.

References Cited in the file of this patent

UNITED STATES PATENTS

| Number | Name | Date |
|---|---|---|
| 1,865,308 | Evans et al. | June 28, 1932 |
| 2,002,807 | Whitson | May 28, 1935 |
| 2,269,767 | Jayne | Jan. 13, 1942 |
| 2,495,491 | Whitson | Jan. 24, 1950 |